(12) United States Patent  (10) Patent No.: US 7,482,798 B2
Han  (45) Date of Patent: Jan. 27, 2009

(54) REGULATED INTERNAL POWER SUPPLY AND METHOD

(75) Inventor: Kang Kheng Han, Singapore (SG)

(73) Assignee: Micron Technology, Inc., Boise, ID (US)

(*) Notice: Subject to any disclaimer, the term of this patent is extended or adjusted under 35 U.S.C. 154(b) by 97 days.

(21) Appl. No.: 11/279,519

(22) Filed: Apr. 12, 2006

(65) Prior Publication Data

US 2007/0164721 A1 Jul. 19, 2007

(30) Foreign Application Priority Data

Jan. 19, 2006 (SG) .............................. 200600373-5

(51) Int. Cl.
G05F 3/16 (2006.01)

(52) U.S. Cl. ...................................................... 323/316

(58) Field of Classification Search ......... 323/312–317, 323/907; 363/59, 60
See application file for complete search history.

(56) References Cited

U.S. PATENT DOCUMENTS

| | | | |
|---|---|---|---|
| 6,232,828 B1 | 5/2001 | Smith et al. | |
| 6,563,371 B2 | 5/2003 | Buckley, III et al. | |
| 6,605,987 B2 | 8/2003 | Eberlein | |
| 6,707,335 B2* | 3/2004 | Kawai et al. ................. | 327/536 |
| 6,724,176 B1* | 4/2004 | Wong et al. .................. | 323/316 |
| 6,754,111 B2 | 6/2004 | Pekny | |
| 6,828,847 B1 | 12/2004 | Marinca | |
| 6,891,358 B2 | 5/2005 | Marinca | |
| 2005/0083129 A1* | 4/2005 | Tsurumaki et al. .......... | 330/285 |
| 2005/0231270 A1 | 10/2005 | Washburn | |
| 2007/0014176 A1* | 1/2007 | Krenzke et al. ............. | 365/226 |

FOREIGN PATENT DOCUMENTS

| | | |
|---|---|---|
| EP | 0794478 A2 | 9/1997 |
| EP | 1359490 A2 | 11/2003 |
| EP | 1510898 | 3/2005 |
| WO | WO-2006036255 | 4/2006 |

OTHER PUBLICATIONS

"International Search Report and Written Opinion filed in corresponding Singapore Application No. 200600373-5", (Sep. 19, 2006), 10 pgs.

(Continued)

*Primary Examiner*—Shawn Riley
(74) *Attorney, Agent, or Firm*—Schwegman, Lundberg & Woessner, P.A.

(57) ABSTRACT

A regulated internal power supply and method are provided. According to various embodiments, a regulated internal power supply system includes a DC to DC converter adapted to connect to an external supply voltage. The converter is further adapted to increase voltage level above a level of the external supply voltage. A low pass filter is connected to the DC to DC converter, and a current-mode bandgap voltage reference (BVR) is connected to the low pass filter. The BVR is adapted to provide second order curvature correction and to provide a tunable voltage reference gradient with respect to the external supply voltage. A power amplifier is connected to the BVR and to a circuit die, to provide a stable internal supply voltage to the die. Other aspects and embodiments are provided herein.

24 Claims, 11 Drawing Sheets

OTHER PUBLICATIONS

Gray, P. R., et al., *Analysis and design of analog integrated circuits*, New York : Wiley, 4th Edition,(2001),309-313.

Johns, D. A., et al., *Analog Integrated Circuit Design*, New York : John Wiley & Sons,(1997),359-363.

Kang, K. H., et al., "A 3.4-PPM/ C 69-dB PSRR Bandgap Voltage Reference at 0.98V Power Supply", *Proc. International Symposium on ICs, Devices and Systems (ISIC)*, (Sep. 2004),3 pages.

Keeth, Brent , et al., *DRAM circuit design : a tutorial*, New York : IEEE,(2001),156-162.

Ker, Ming-Dou , et al., "New curvature-compensation technique for CMOS bandgap reference with sub-1-V operation", *IEEE International Symposium on Circuits and Systems, 2005, ISCAS 2005.*, (2005),3861-3864.

Leung, C. Y., et al., "Design of a 1.5-V high-order curvature-compensated CMOS bandgap reference", *Proceedings of the 2004 Internatioanl Symposium on Circuits and Systems, 2004, ISCAS '04.*, (2004),I—48-52.

Meijer, Gerard C., et al., "Temperature sensors and voltage references implemented in CMOS technology", *IEEE Sensors Journal*, 1(3), (Oct. 2001),225-234.

Paul, R. , et al., "Design of second-order sub-bandgap mixed-mode voltage reference circuit for low voltage applications", *18th International Conference on VLSI Design, 2005.*, (Jan. 3-7, 2005),307-312.

Rich, Alan , "Intersil Voltage Reference Application and Design Note", *Intersil Application Note*, http://www.intersil.com/data/an/an177.pdf,(2005),1-33.

Rincon-Mora, Gabriel A., et al., *Voltage References: From Diodes to Precision High-Order Bandgap Circuits*, Piscataway, NJ : IEEE Press ; New York : Wiley-Interscience,(2002),72, 99-104.

Seo, Yoon-Deuk , et al., "Low-power CMOS on-chip voltage reference using MOS PTAT: an EP approach", *Tenth Annual IEEE International ASIC Conference and Exhibit, 1997. Proceedings.*, (1997),316-320.

Waltari, M. , et al., "Reference voltage driver for low-voltage CMOS A/D converters", *The 7th IEEE International Conference on Electronics, Circuits and Systems, 2000. ICECS 2000.*, (Dec. 2000),28-31.

* cited by examiner

REGULATED INTERNAL POWER SUPPLY AND METHOD

This application claims priority under 35 U.S.C. 119 from Singapore Application No. 200600373-5 filed Jan. 19, 2006, which application is incorporated herein by reference.

TECHNICAL FIELD

This disclosure relates to electrical circuits, and more particularly, to regulated power supplies.

BACKGROUND

Many analog and digital circuits require a stable, regulated power supply to generate predictable and repeatable performance. However, it is becoming increasingly difficult to integrate a regulator into a die as power supply voltage levels decrease for modem integrated circuits. For example, first generation Double Data Rate Synchronous Dynamic Random Access Memory (SDRAM DDR1) devices use a 2.5 Volt supply voltage and second generation devices (SDRAM DDR2) use a 1.8 Volt supply. These DDR2 SDRAM devices have a supply voltage at 1.8 Volts and internal circuitries that are designed to work using a 1.8 Volt supply voltage. Thus, no extra voltage headroom is available for use of a conventional voltage regulator.

SUMMARY

The present system provides method and apparatus to address the foregoing needs and additional needs not stated herein. Disclosed herein, among other things, is a regulated internal power supply. One aspect of this disclosure relates to an internal power supply system. According to various embodiments, the system includes a DC to DC converter adapted to connect to an external power supply and also adapted to increase voltage level above a level of the external supply voltage. The system also includes a low pass filter connected to the DC to DC converter. The system further includes a voltage reference circuit adapted to connect the low pass filter to a power amplifier to provide an internal supply voltage to a circuit die. The voltage reference circuit includes a temperature curvature compensating circuit adapted to provide second order curvature correction by summing two currents in the circuit that are of opposite dependencies on temperature. The voltage reference circuit also includes at least one variable resistor to provide a tunable voltage reference magnitude level, and at least one pair of current mirrors with same aspect ratios but different channel lengths to provide a tunable voltage reference gradient with respect to the external power supply.

Another embodiment of the power supply system includes a DC to DC converter adapted to connect to an external supply voltage, the converter further adapted to increase voltage level above a level of the external supply voltage. The system further includes a low pass filter connected to the DC to DC converter. In addition the system includes a current-mode bandgap voltage reference (BVR) connected to the low pass filter. The BVR is adapted to provide second order curvature correction and to provide a tunable voltage reference gradient with respect to the external supply voltage. Various system embodiments include a power amplifier connected to the BVR and to a circuit die, the power amplifier adapted to provide a stable internal supply voltage to the die.

Another aspect of this disclosure relates to a semiconductor die having an internal power supply. The semiconductor die includes a substrate and an integrated circuit formed on the substrate. The semiconductor die also includes the described power supply formed on the substrate and adapted to supply current to the integrated circuit.

One aspect of this disclosure relates to an electronic system having a regulated power supply. The electronic system includes a processor and a memory system coupled to the processor. The memory system includes at least one memory circuit and the described power supply adapted to supply current to the memory circuit.

One aspect of this disclosure relates to a method for providing a regulated internal voltage supply. Various method embodiments include receiving a voltage signal having a first potential from an external supply. The method also includes increasing the voltage signal to a second potential using a DC to DC converter, wherein the second potential is greater than the first potential. The method further includes removing high frequency components from the voltage signal. In addition, the method includes providing a voltage reference to at least one power amplifier, the voltage reference having a tunable gradient with respect to the first voltage level using a current-mode bandgap voltage reference (BVR), the BVR having the voltage signal as an input. Thus, a stable internal supply voltage is provided to a circuit die connected to the at least one power amplifier.

One aspect of this disclosure relates to a method for manufacturing a regulated internal power supply. Various embodiments of the method includes forming a DC to DC converter adapted to connect to an external power supply, the converter further adapted to increase voltage level above a level of the external supply voltage at the input node. The method further includes forming a low pass filter connected to the DC to DC converter. In addition, the method includes forming a current-mode bandgap voltage reference (BVR) connected to the low pass filter, the BVR adapted to provide second order curvature correction and to provide a tunable voltage reference gradient with respect to the external supply voltage. According to various embodiments, the method includes forming a power amplifier connected to the BVR and to a circuit die, the power amplifier adapted to provide a stable internal supply voltage to the die.

This Summary is an overview of some of the teachings of the present application and not intended to be an exclusive or exhaustive treatment of the present subject matter. Further details about the present subject matter are found in the detailed description and appended claims.

DETAILED DESCRIPTION

The following detailed description refers to the accompanying drawings which show, by way of illustration, specific aspects and embodiments in which the present invention may be practiced. The various embodiments are not necessarily mutually exclusive, as aspects of one embodiment can be combined with aspects of another embodiment. These embodiments are described in sufficient detail to enable those skilled in the art to practice the invention. Other embodiments may be utilized and structural, logical, and electrical changes may be made without departing from the scope of the present invention.

It should be noted that references to "an", "one", or "various" embodiments in this disclosure are not necessarily to the same embodiment, and such references contemplate more than one embodiment.

Disclosed herein is a robust curvature compensated voltage reference to provide an internal supply voltage for low voltage devices. The internal supply voltage has a tunable positive gradient with respect to the external supply voltage for margin testing. In addition, the internal supply voltage is independent of variations in the external supply voltage and variations in temperature over its designed operating range. The internal supply voltage provided by the present subject matter is capable of manufacture by common semiconductor fabrication techniques.

Regulated Internal Power Supply

Figure 1A:
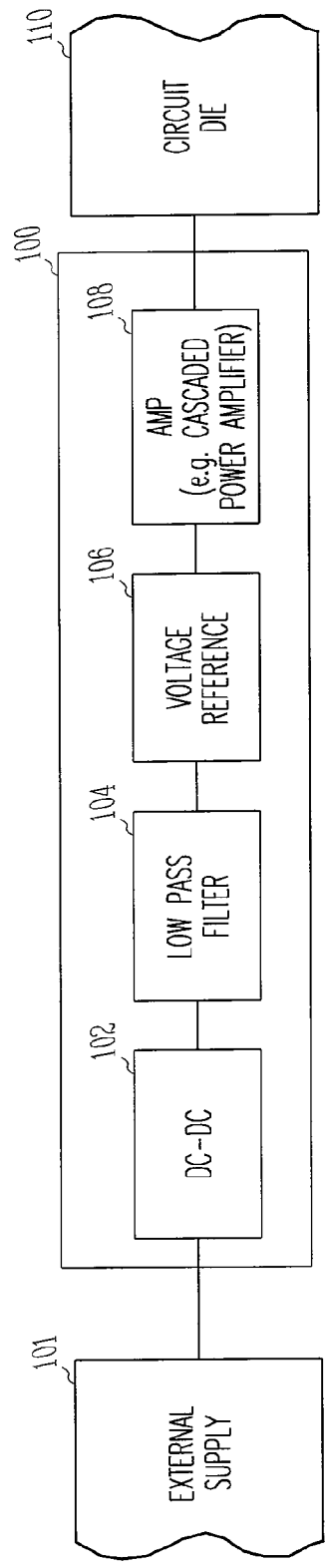
FIG. 1A illustrates a block diagram of a regulated internal power supply system, according to various embodiments.

FIG. 1A illustrates a block diagram of a regulated internal power supply system, according to various embodiments. The power supply system 100 includes a DC to DC converter 102 adapted to connect to an external supply voltage 101, the converter further adapted to increase voltage level above a level of the external supply voltage. The system further includes a low pass filter 104 connected to the DC to DC converter. In addition the system includes a current-mode bandgap voltage reference (BVR) 106 connected to the low pass filter. The BVR 106 is adapted to provide second order curvature correction and to provide a tunable voltage reference gradient with respect to the external supply voltage. Various system embodiments include a power amplifier 108 connected to the BVR and to a circuit die 110, the power amplifier adapted to provide a stable internal supply voltage to the die.

According to various embodiments, the DC to DC converter 102 includes a switched-capacitor power supply converter. The ripple noise from the switched capacitors can be filtered out using the low pass filter and the high pass power supply rejection ratio (PSRR) of the voltage reference and power amplifier. According to various embodiments, the DC to DC converter includes a converter having at least 90% power efficiency. According to various embodiments, the DC to DC converter includes at least one charge pump. Some existing SDRAM circuitry already includes one or more charge pumps with lower power efficiency that could be modified into power efficient converters designed to drive resistive loads. The number of charge pumps required is determined by the maximum current drive of each charge pump and the maximum total current consumption of the voltage reference, power amplifiers and die core. The charge pumps can be either integrated on the die or as a separate package on the module, in various embodiments.

For a device which requires the internal supply voltage to be at least equal to the external supply voltage, a DC to DC step up converter is required to provide the boosted external supply voltage to the voltage reference and power amplifier. For devices which do not have this requirement, the boosted external supply voltage is also useful to provide additional voltage headroom to implement circuit techniques to improve the performance of the voltage reference and power amplifier. The converter is highly power efficient and has small size, according to various embodiments. Multiple converters can be cascaded to provide the necessary current, according to various embodiments. The converter can be integrated on the chip or on the circuit board, according to various embodiments.

The low pass filter 104 includes an RC (resistor-capacitor) filter to filter high frequency noise, according to various embodiments. Low frequency noise is removed by the PSRR of the voltage reference and power amplifier, so the internal supply voltage signal will have less noise than a non-regulated supply voltage. The voltage regulator can produce a zero gradient under normal usage and produce a slight positive gradient with the external supply voltage while testing.

The amplifier 108 is an output buffer adapted to drive the die core. It takes in the reference voltage (Vref) as its input and outputs the internal supply voltage. According to various embodiments, the amplifier maintains a constant internal supply voltage output while driving a maximum load of the die core. According to various embodiments, multiple amplifiers can be cascaded to provide load regulation. The PSRR of the amplifier is sufficient to remove low frequency noise, according to various embodiments. Other embodiments are possible without departing from the scope of the present subject matter.

Figure 1B:
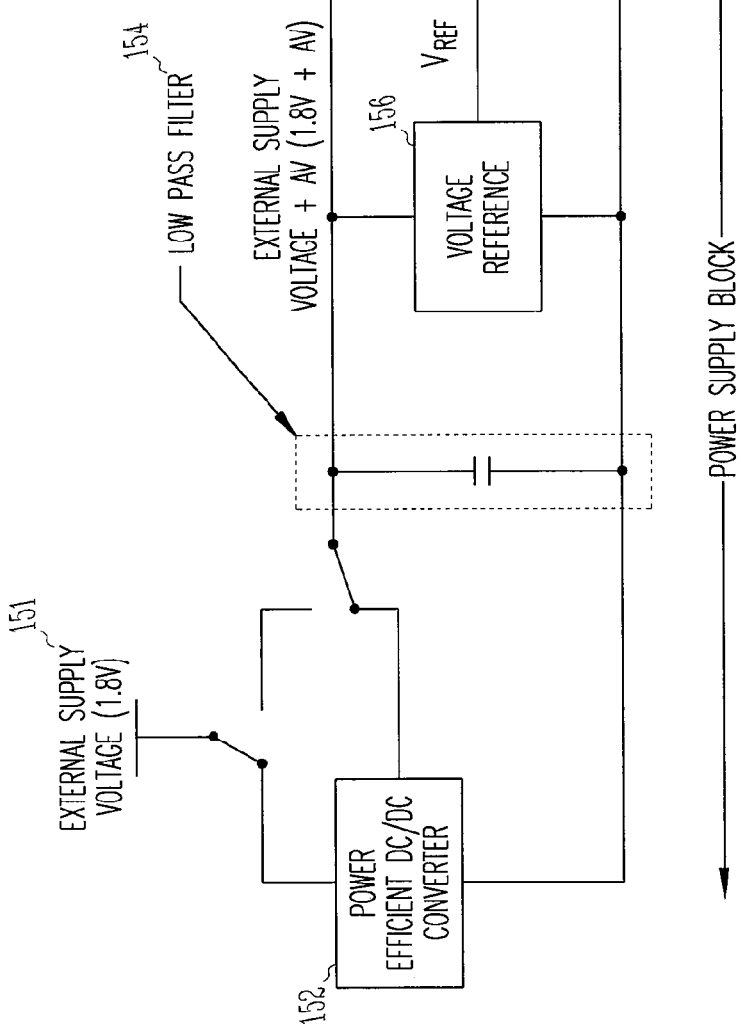
FIG. 1B illustrates a block circuit diagram of a regulated internal power supply system, according to various embodiments.

FIG. 1B illustrates a block circuit diagram of a regulated internal power supply system, according to various embodiments. According to various embodiments, the system 150 includes a DC to DC converter 152 adapted to connect to an external power supply 151 and also adapted to increase voltage level above a level of the external supply voltage. The system also includes a low pass filter 154 connected to the DC to DC converter. The system further includes a voltage reference circuit 156 adapted to connect the low pass filter to a power amplifier 158 to provide an internal supply voltage to a circuit die 160. According to various embodiments, the voltage reference circuit includes a temperature curvature compensating circuit adapted to provide second order curvature correction by summing two currents in the circuit that are of opposite dependencies on temperature. The voltage reference circuit also includes at least one variable resistor to provide adjustment to the overall magnitude of Vref, and a series of current mirrors with approximately the same aspect ratios but different channel lengths to provide a tunable voltage reference gradient with respect to the external power supply, according to various embodiments.

The circuit die includes at least one low voltage electronic device, in one embodiment. Low voltage electronic devices include CMOS (complementary metal oxide semiconductor field effect transistor) image sensors, certain SDRAM devices, or other devices where internal power supply requirements are equal or slightly higher than the external supply level. According to various embodiments, the external power supply has a potential of 1.8 Volts. According to various embodiments, the external power supply has a potential of 2.5 Volts. According to various embodiments, the described system can accommodate external supply voltages with a wide range of potentials, even below 1.0 Volts. The external power supply can have a wide range of potentials within the energy efficient input voltage working range of the DC to DC converter, according to various embodiments. Other embodiments are possible without departing from the scope of the present subject matter.

Figure 2A:
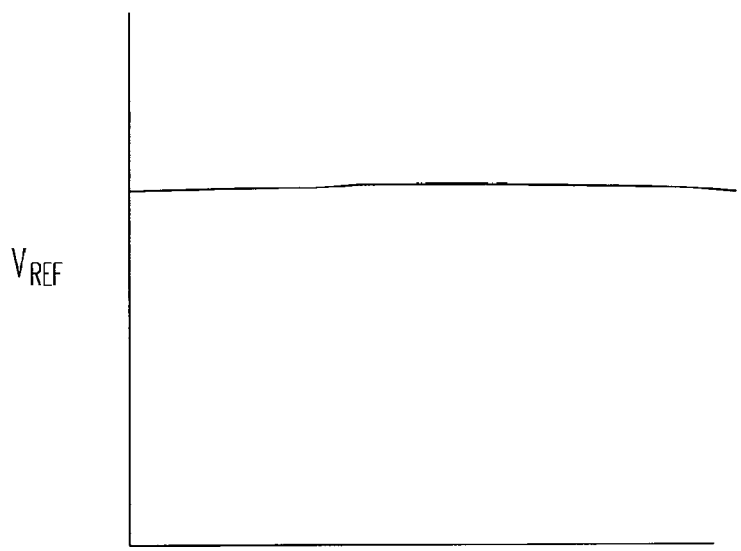
FIG. 2A illustrates a graphic representation of temperature sensitivity for a regulated internal power supply voltage reference, according to various embodiments.
Figure 2B:
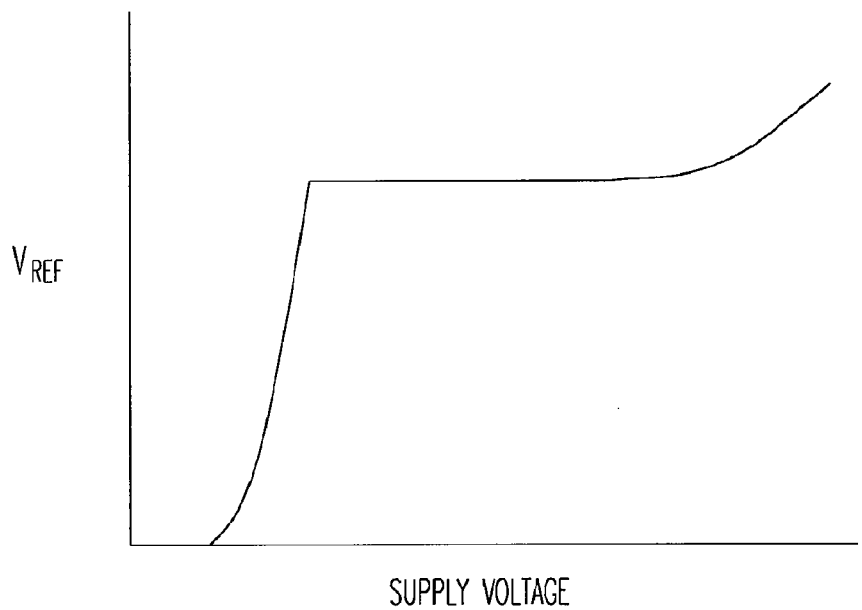
FIG. 2B illustrates a graphic representation of external supply voltage sensitivity of a regulated internal power supply voltage reference, according to various embodiments.

FIGS. 2A and 2B illustrate the typical characteristics of a bandgap voltage reference. FIG. 2A illustrates a graphic representation of temperature sensitivity for a regulated internal power supply voltage reference, according to various embodiments. The reference voltage (Vref) supplied is shown as a constant over a designated operating temperature range. One industrial standard includes an operating temperature range of –40 degrees Celsius to 85 degrees Celsius. Other operating temperature ranges are within the scope of this disclosure. FIG. 2B illustrates a graphic representation of external supply voltage sensitivity of a regulated internal power supply voltage reference, according to various embodiments. This illustrates that Vref is constant in the designed operating supply voltage range after powering up, according to various embodiments.

Figure 2C:
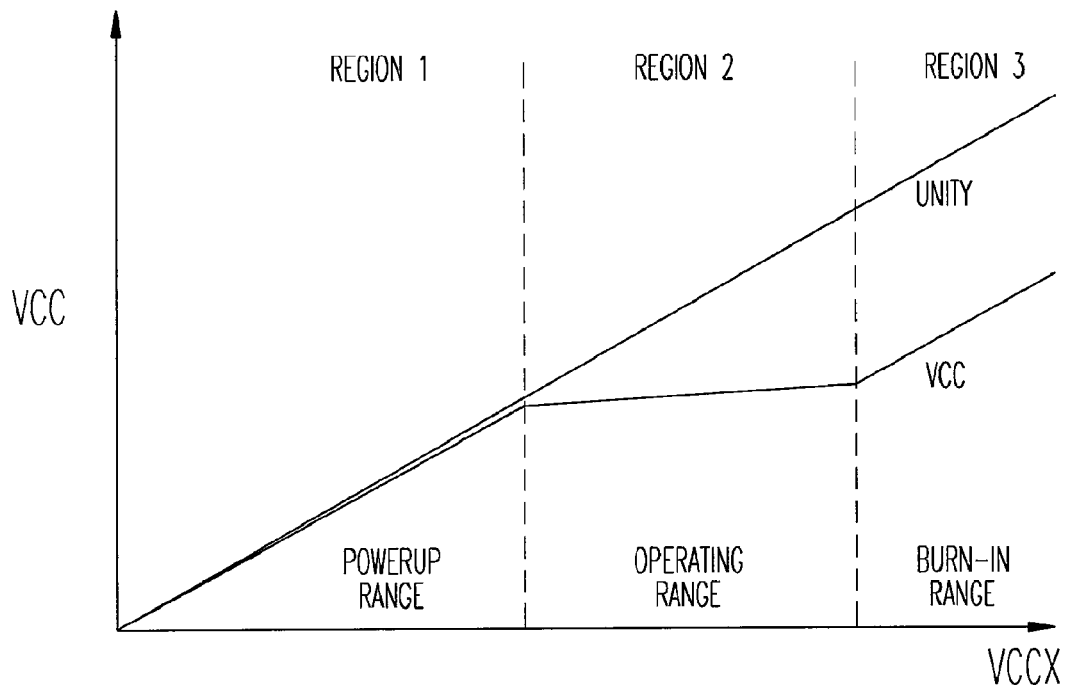
FIG. 2C illustrates a graphic representation of ideal characteristics of a regulated internal power supply voltage reference, according to various embodiments.

FIG. 2C illustrates a graphic representation of ideal characteristics of a regulated internal power supply voltage reference, according to various embodiments. In region 1, the regulated voltage (Vcc) is shorted to the supply voltage (Vccx) during power up and power down to ensure data retention during low voltage conditions. In region 2, which includes the designated operating range, Vcc has a moderate dependency on Vccx to allow margin testing and characterization. In region 3, both temperature and Vcc are raised above the normal operating range for burn-in to identify infant failures. Voltage in region 3 can be achieved by tying Vref two diode drops below Vccx.

Figure 3A:
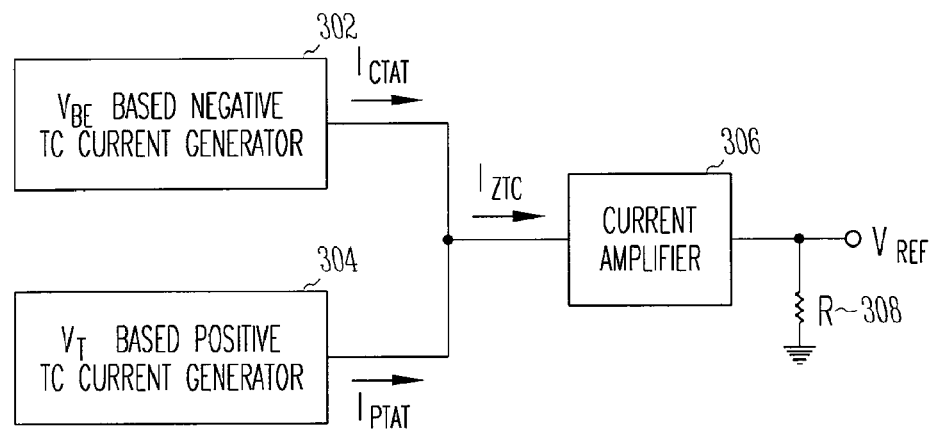
FIG. 3A illustrates a block diagram of a current-mode bandgap reference circuit, according to various embodiments.

FIG. 3A illustrates a block diagram of a current-mode bandgap reference circuit, according to various embodiments. The reference includes curvature correction, according to various embodiments. To allow for testing of the product margin, the Vref output is designed to have an adjustable positive gradient with the increase in Vccx. A current-mode voltage reference sums positive temperature coefficient (TC) current ($I_{PTAT}$) and negative TC current ($I_{CTAT}$), to produce a zero TC current ($I_{ZTC}$). $I_{PTAT}$ is proportional to absolute temperature (PTAT) and $I_{CTAT}$ is complementary to absolute temperature (CTAT). $I_{CTAT}$ is formed by a base-emitter voltage ($V_{BE}$) based current generator 302 and $I_{PTAT}$ is formed by a thermal voltage ($V_T$) based current generator 304. The sum, $I_{ZTC}$, is passed through a current amplifier 306 and a resistor 308 to generate the reference voltage, Vref.

Figure 3B:
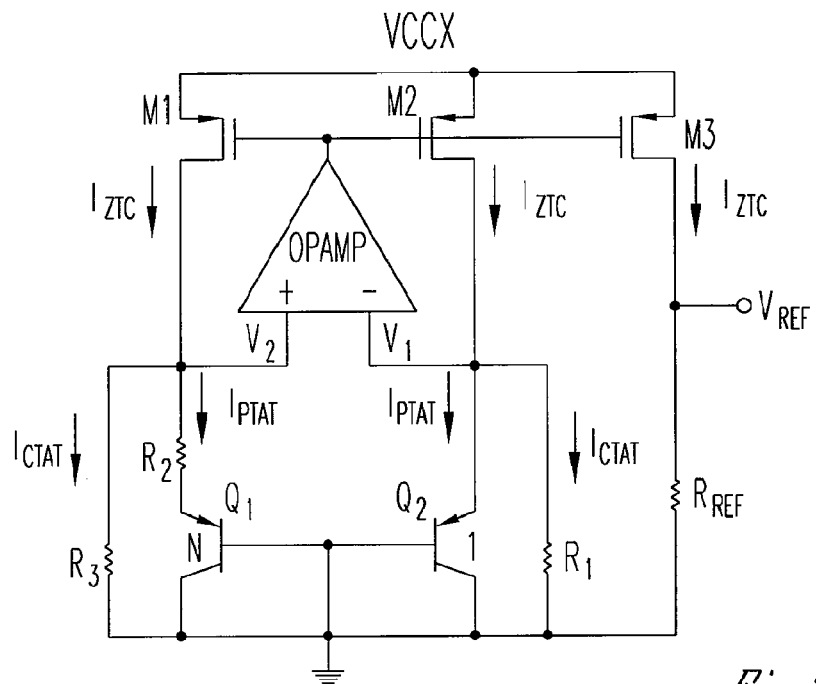
FIG. 3B illustrates a schematic diagram of a current-mode bandgap reference circuit, according to various embodiments.

FIG. 3B illustrates a schematic diagram of a current-mode bandgap reference circuit, according to various embodiments. Using the current summing described with reference to FIG. 3A and the values of the components from the basic bandgap reference circuit of FIG. 3B, the reference voltage is defined by the following equation:

$$Vref = Rref[V_{BE(Q1)}/R_1 + (V_{Tx} \ln N)/R_3]$$

As can be seen from this equation, an advantage of the current-mode technology over voltage-mode bandgap references is that the resistance is in ratio form. Thus, even if the resistors have finite TC, the temperature effect can be canceled out by using the same type of resistors. Therefore, matching resistors ensures the accuracy of the output reference voltage.

Figure 3C:
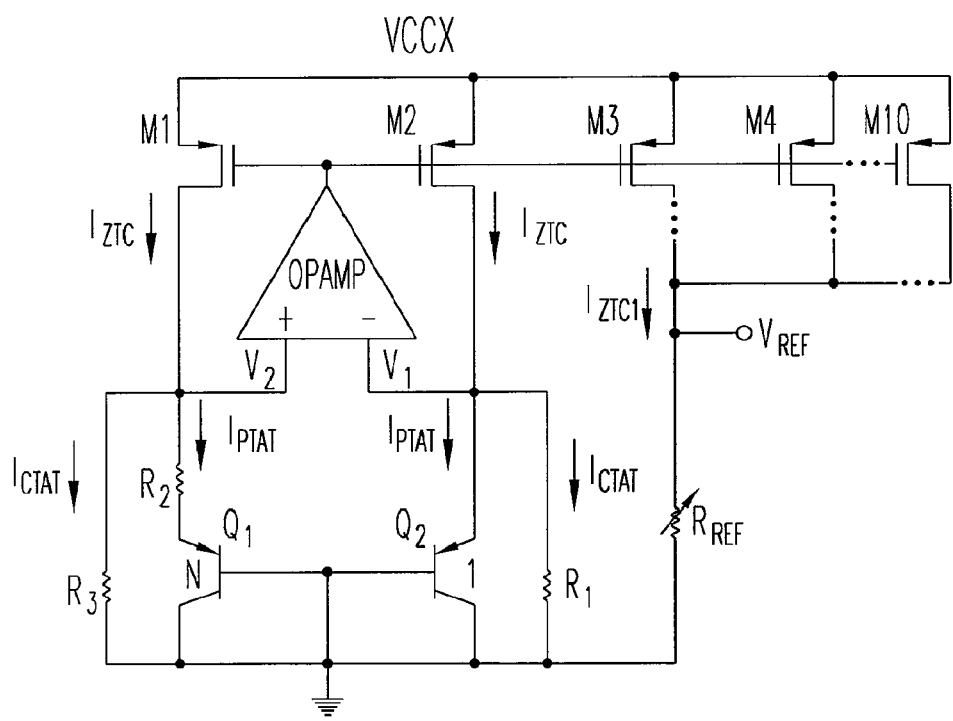
FIG. 3C illustrates a schematic diagram of a current-mode bandgap reference circuit with a tunable gradient, according to various embodiments.

FIG. 3C illustrates a schematic diagram of a current-mode bandgap reference circuit with a tunable gradient, according to various embodiments. To design for testability, a current-mode bandgap reference with a tunable Vref to Vccx gradient is provided. This circuit provides the tunable gradient by taking advantage of the short channel modulation effect of a PMOS (P-type metal oxide semiconductor field effect transistor) current mirror. In FIG. 3C, the aspect ratios of transistors M3 to M10 have a width to length ratio of approximately 10, but with varying channel length according to an embodiment. According to various embodiments, the width and length (W and L) are nominally 1 micron. Resistor Rref is variable to make corresponding adjustments in the magnitude of Vref, according to an embodiment, which eliminates the need for a non-inverting operational amplifier to trim Vref. An output buffer is used to improve bandwidth and slew rate. The depicted switches can be implemented as fuses or programmable logic switches. For short channel length PMOS in saturation, the drain current is given by $$I_D = \tfrac{1}{2}\mu_n C_{ox} W/L (V_{GS} - V_t)^2 (1 + \lambda V_{DS})$$

where the positive constant $\lambda$ is the MOSFET channel length parameter. Given that all other variables in the equation remain constant, the drain current will increase when $\lambda$ increases, and $\lambda$ will increase when the channel length decreases even though the aspect ratio remains the same. This will correspondingly increase the output branch current $I_{ZTC1}$ while keeping the current in other branches constant. The output reference voltage, Vref, still has a zero temperature coefficient as only the magnitude of $I_{ZTC}$ is increased in $I_{ZTC1}$, not the temperature coefficient.

Figure 4A:
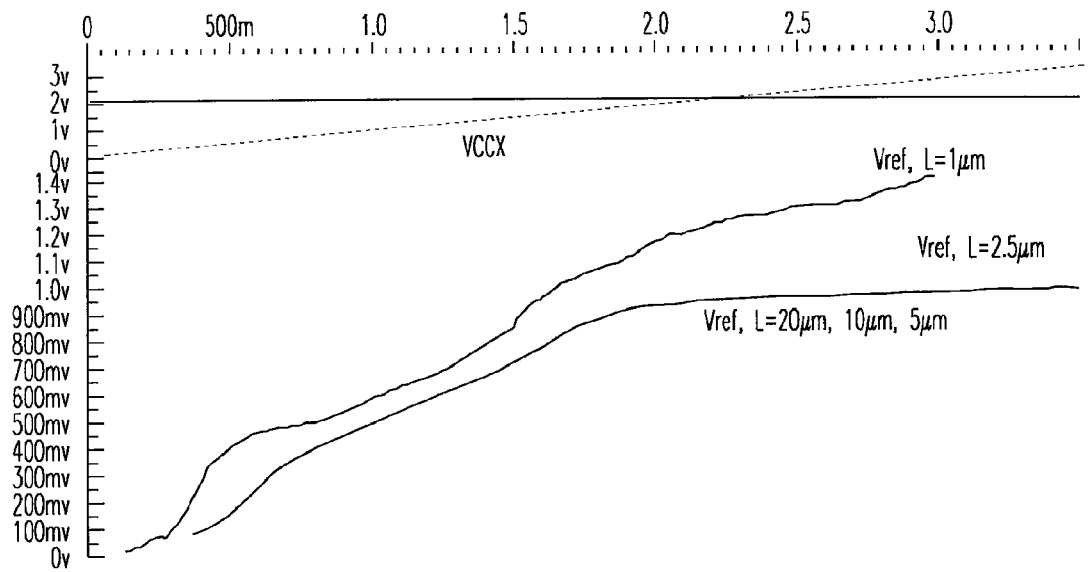
FIG. 4A illustrates a graphic representation of voltage reference characteristics with varying device channel lengths, according to various embodiments.

FIG. 4A illustrates a graphic representation of voltage reference characteristics with varying device channel lengths, according to various embodiments. This illustration was generated by a computer simulation, showing the increase in the Vref vs. Vccx gradient by decreasing the channel lengths of the transistors (M3 through M10 in FIG. 3C). An optimized combination of the channel length and Rref can be determined by iteration to give the desired level of Vref.

Figure 4B:
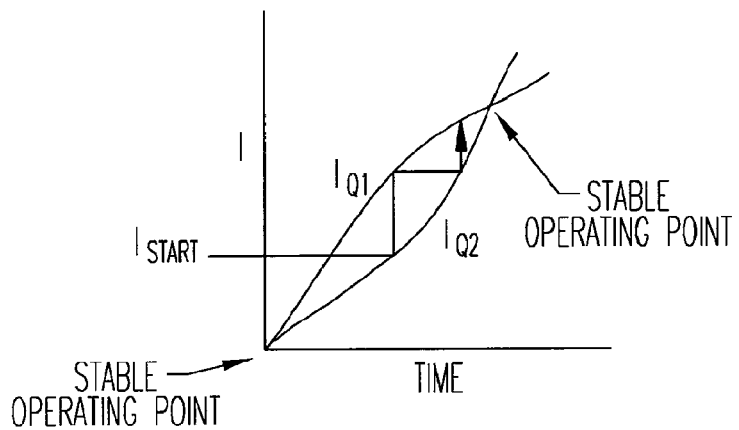
FIG. 4B illustrates a graphic representation of voltage reference characteristics at startup, according to various embodiments.

FIG. 4B illustrates a graphic representation of voltage reference characteristics at startup, according to various embodiments. This illustration shows how the current varies through Q1 and Q2 (in FIG. 3C) during startup. A startup circuit ensures a nonzero current state by sourcing or sinking a small amount of current to or from the current generator. This startup current is fed into a low-impedance node, such as V1 or V2 in FIG. 3C. The current is then amplified through the loop gain from the bipolar transistors Q1 and Q2 and the operational amplifier gain. Using the current mode bandgap reference decreases the design complexity of the startup circuit and also decreases the current consumption of the circuit.

The bandgap reference can also operate at a lower supply voltage in current mode as compared to voltage mode. One reason for this is that the voltage drop across the MOS current mirror will be less than that across resistors used in voltage mode. Another reason is that Q1 and Q2 do not need to be operating in the active region to achieve a zero temperature coefficient for Vref. Q1 and Q2 can operate at conditions as low as sub 1 μA collector currents. If these transistors are operated in their saturation region, additional voltage headroom is available to implement the addition of a cascade current mirror to improve current accuracy and power supply rejection ratio (PSRR). Further improvements to line regulation and noise immunity can be made to the voltage reference by improving the PSRR. Techniques to improve PSRR include pre-regulating the supply voltage or increasing the impedance from the sensitive node, Vref, to the power supply by using cascode structures.

To further reduce the temperature coefficient of the output reference voltage, second order compensation can be done in the generation of $I_{CTAT}$, which is based on $V_{BE}$ as discussed above. As can be seen from the following equation, $V_{BE}$ is not linearly proportional to temperature.

$$V_{BE}(T)=V_{BG}-(V_{BG}-B_{BE0})T/T_0-(\eta-\alpha)V_T \ln T/T_0$$

One way to achieve second order curvature correction is by creating a non-linear PTAT current, $I_{NL}$, to cancel out the non-linear $I_{CTAT}$, according to various embodiments.

Figure 5:
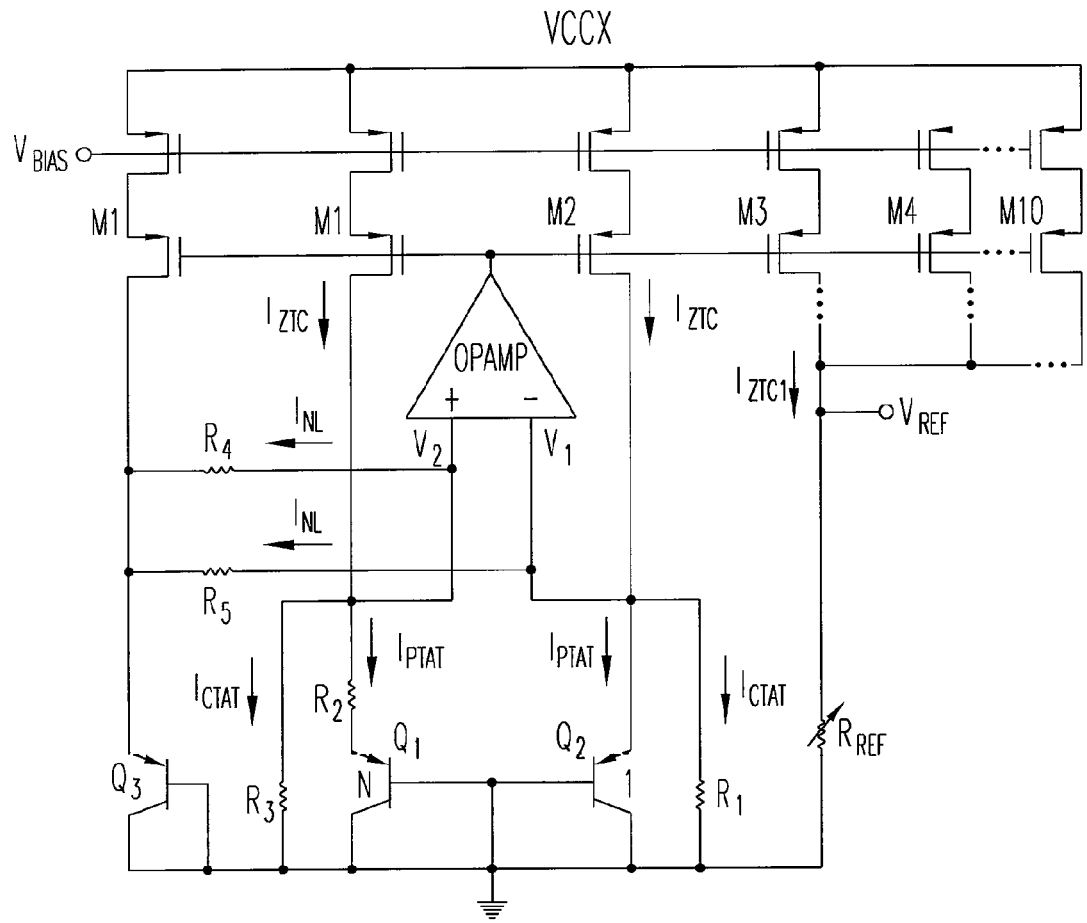
FIG. 5 illustrates a schematic diagram of a current-mode bandgap reference circuit with a tunable gradient and second order curvature correction, according to various embodiments.

FIG. 5 illustrates a schematic diagram of a current-mode bandgap reference circuit with a tunable gradient and second order curvature correction, according to various embodiments. This bandgap reference has second order curvature correction and a cascode current mirror to improve PSRR and current mirroring accuracy. The cascode current mirror can be designed as self-biasing within the bandgap for improved power supply insensitivity, according to various embodiments.

Method for Providing a Regulated Internal Power Supply

Figure 6A:
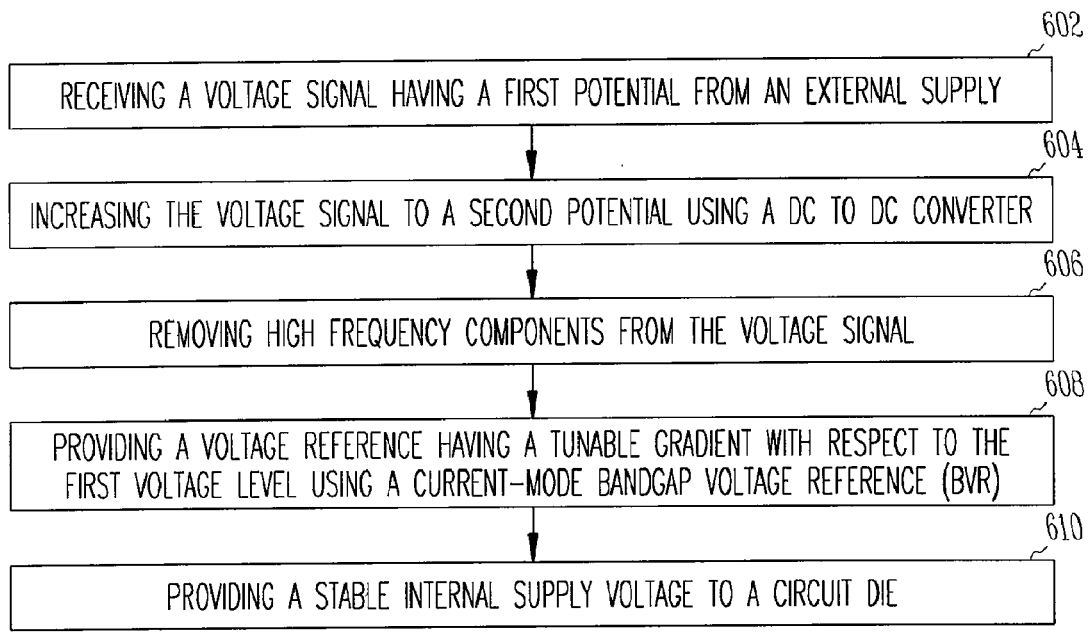
FIG. 6A illustrates a flow diagram of a method for providing a regulated internal power supply, according to various embodiments.

FIG. 6A illustrates a flow diagram of a method 600 for providing a regulated internal power supply, according to various embodiments. Various method embodiments include receiving a voltage signal having a first potential from an external supply, at 602. The method also includes increasing the voltage signal to a second potential using a DC to DC converter, wherein the second potential is greater than the first potential, at 604. The method further includes removing high frequency components from the voltage signal, at 606. In addition, the method includes providing a voltage reference to at least one power amplifier, the voltage reference having a tunable gradient with respect to the first voltage level using a current-mode bandgap voltage reference (BVR), the BVR having the voltage signal as an input, at 608. The method also includes providing a stable internal supply voltage to a circuit die connected to the power amplifier, at 610.

According to various embodiments, removing high frequency components from the voltage signal includes using an RC low pass filter. According to various embodiments, providing a stable internal supply voltage to a circuit die includes cascading multiple power amplifiers. According to various embodiments, providing a voltage reference includes providing a voltage reference having second order curvature correction. According to various embodiments, providing a voltage reference includes using short channel modulation effect of a current mirror. Other methods of providing the regulated internal power supply are within the scope of this disclosure.

Method for Manufacturing a Regulated Internal Power Supply

Figure 6B:
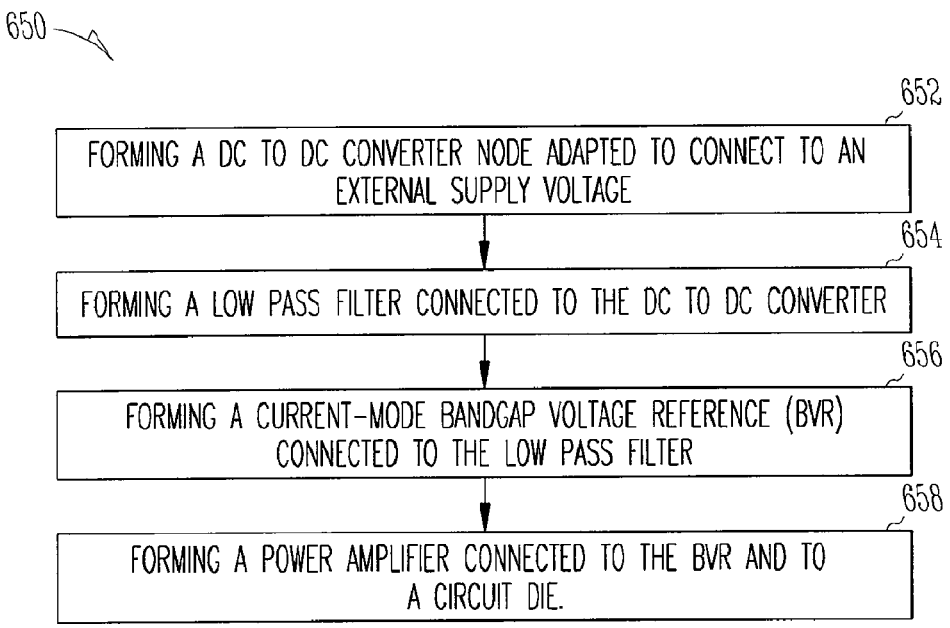
FIG. 6B illustrates a flow diagram of a method for manufacturing a regulated internal power supply, according to various embodiments.

FIG. 6B illustrates a flow diagram of a method 650 for manufacturing a regulated internal power supply, according to various embodiments. Various embodiments of the method includes forming a DC to DC converter adapted to connect to an external power supply, the converter further adapted to increase voltage level above a level of the external supply voltage at the input node, at 652. The method further includes forming a low pass filter connected to the DC to DC converter, at 654. In addition, the method includes forming a current-mode bandgap voltage reference (BVR) connected to the low pass filter, the BVR adapted to provide second order curvature correction and to provide a tunable voltage reference gradient with respect to the external supply voltage, at 656. According to various embodiments, the method includes forming a power amplifier connected to the BVR and to a circuit die, the power amplifier adapted to provide a stable internal supply voltage to the die, at 658.

According to various embodiments, the DC to DC converter is adapted to connect to a supply voltage level of 1.8 Volts. According to various embodiments, the power amplifier is adapted to connect to the BVR and to a circuit die including at least one memory circuit. According to various embodiments, a current-mode bandgap voltage reference having an adjustable positive gradient with respect to the external supply voltage is formed, which includes summing positive temperature coefficient (TC) current and negative TC current. Other methods of making the regulated internal power supply are within the scope of this disclosure.

Applications Using a Regulated Internal Power Supply

In the remaining figures, wafers and dies will be described as they are used in a variety of applications. According to the teachings of the present disclosure, some of these dies, it will be appreciated, contain at least one regulated internal power supply. They also contain other integrated circuit elements such as capacitors, transistors, lines, interconnects, plugs, pads, I/O connections, insulators and other known elements.

Figure 7:
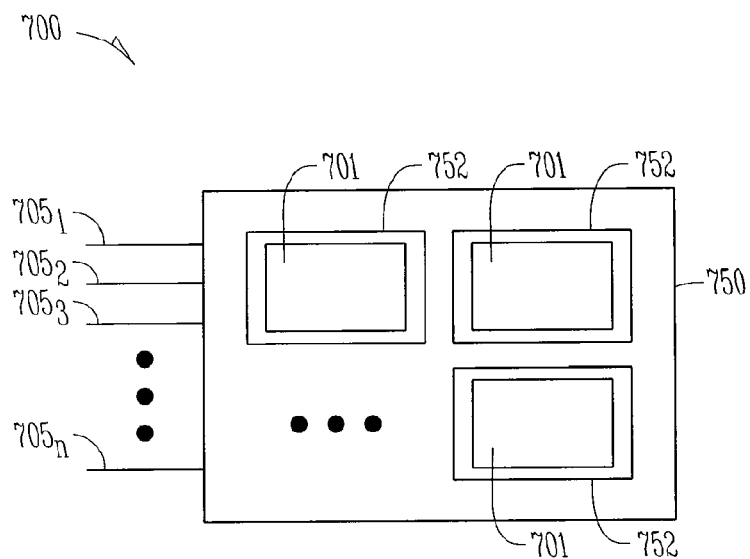
FIG. 7 illustrates a block diagram of a circuit module, according to various embodiments.

As shown in FIG. 7, two or more dies 701 may be combined, with or without protective casing, into a circuit module 700 to enhance or extend the functionality of an individual die 701. Circuit module 700 may be a combination of dies 701 representing a variety of functions, or a combination of dies 701 containing the same functionality. In one embodiment, circuit module 700 includes at least one socket, slot, recess or the like 752 into which the die 701 is received. Slot 752 in one embodiment is a circuit board 750. Slot 752, in another embodiment, represents a mount including land patterns. In any embodiment, dies 701 may be received by slot 752 in a pick-and-place operation by suitable pick-and-place machines.

Some examples of a circuit module 700 include memory modules, device drivers, power modules, communication modems, processor modules and application-specific modules, and may include multilayer, multi-chip modules. Such modules will have a chip receiver in which a chip according to the present disclosure is inserted. Circuit module 700 may be a subcomponent of a variety of electronic systems, such as a clock, a television, a cell phone, a personal computer, an automobile, an industrial control system, an aircraft and others. Such modules will have a circuit module receiver in which a circuit module according to the present disclosure is inserted. Circuit module 700 will have a variety of leads $705_1$ through $705_N$ extending therefrom providing unilateral or bilateral communication and control in its particular application.

Figure 8:
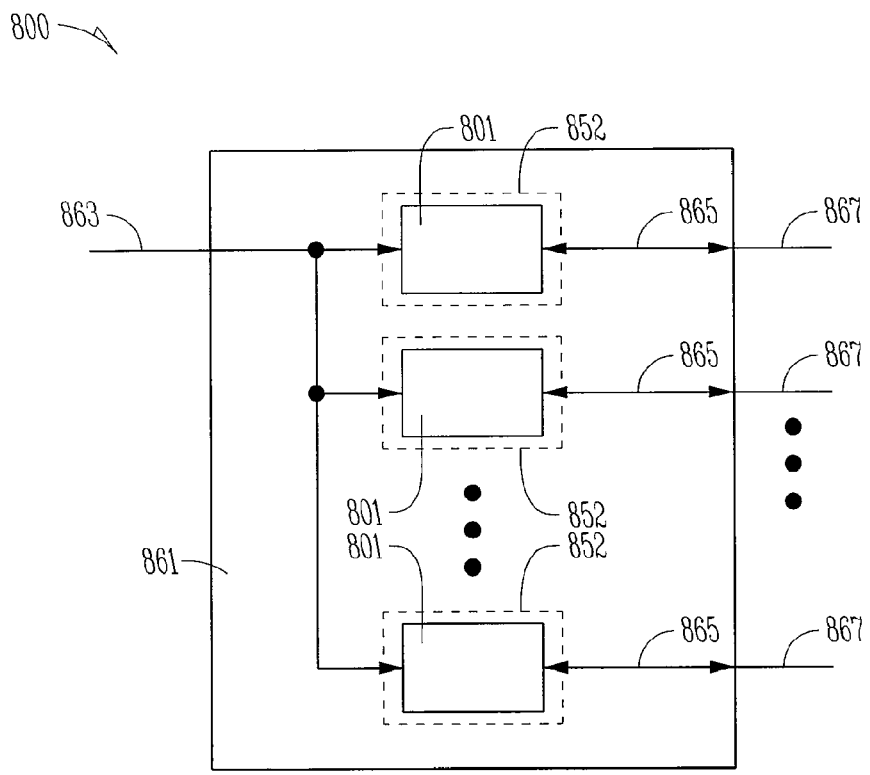
FIG. 8 illustrates a block diagram of a memory module, according to various embodiments.

FIG. 8 shows one embodiment of a circuit module as memory module 800. Memory module 800 contains multiple memory devices 801 contained on support 861. Representative memory devices include, but are not limited to DRAM, SRAM, SDRAM, EEPROM, flash memory, ROM, etc. In one embodiment, support 861 includes slots 852 for receiving memory devices 801. The number of memory devices generally depends upon the desired bus width and the desire for parity. Memory devices 801 include at least one die having a power supply in accordance with the present disclosure. The support 861 includes sockets, slots, recesses or the like 852, each adapted to receive a memory device 801 and provide electrical communication between a bus and memory device 801. Memory module 800 accepts a command signal from an external controller (not shown) on a command link 863 and provides for data input and data output on data links 865. The command link 863 and data links 865 are connected to leads 867 extending from the support 861. Leads 867 are shown for conceptual purposes and are not limited to the position shown.

Figure 9:
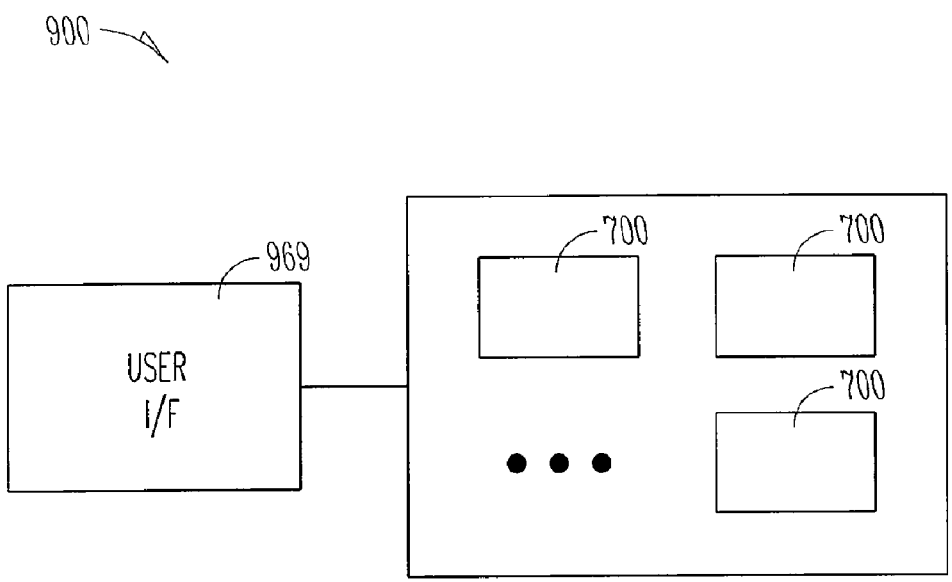
FIG. 9 illustrates a block diagram of an electronic system, according to various embodiments.

FIG. 9 shows one embodiment of an electronic system 900 containing one or more circuit modules 700. At least one of the circuit modules 700 contains a die having a regulated internal power source in accordance with the present disclosure. Electronic system 900 generally contains a user interface 969. User interface 969 provides a user of the electronic system 900 with some form of control or observation of the results of the electronic system 900. Some examples of user interface 969 include: the keyboard, pointing device, monitor or printer of a personal computer; the tuning dial, display or speakers of a radio; the ignition switch, gauges or gas pedal of an automobile; and the card reader, keypad, display or currency dispenser of an automated teller machine. User interface 969 may further describe access ports provided to electronic system 900. Access ports are used to connect an electronic system to the more tangible user interface components previously exemplified. One or more of the circuit modules 700 may be a processor providing some form of manipulation, control or direction of inputs from or outputs to user interface 969, or of other information either preprogrammed into, or otherwise provide to, electronic system 900. In another embodiment, electronic system 900 includes memory modules 800. As will be apparent from the lists of examples previously given, electronic system 900 will often be associated with certain mechanical components (not shown) in addition to circuit modules 700 and user interface 969. It will be appreciated that one or more circuit modules 700 in electronic system 900 can be replaced by a single integrated circuit. Furthermore, electronic system 900 may be a subcomponent of a larger electronic system.

Figure 10:
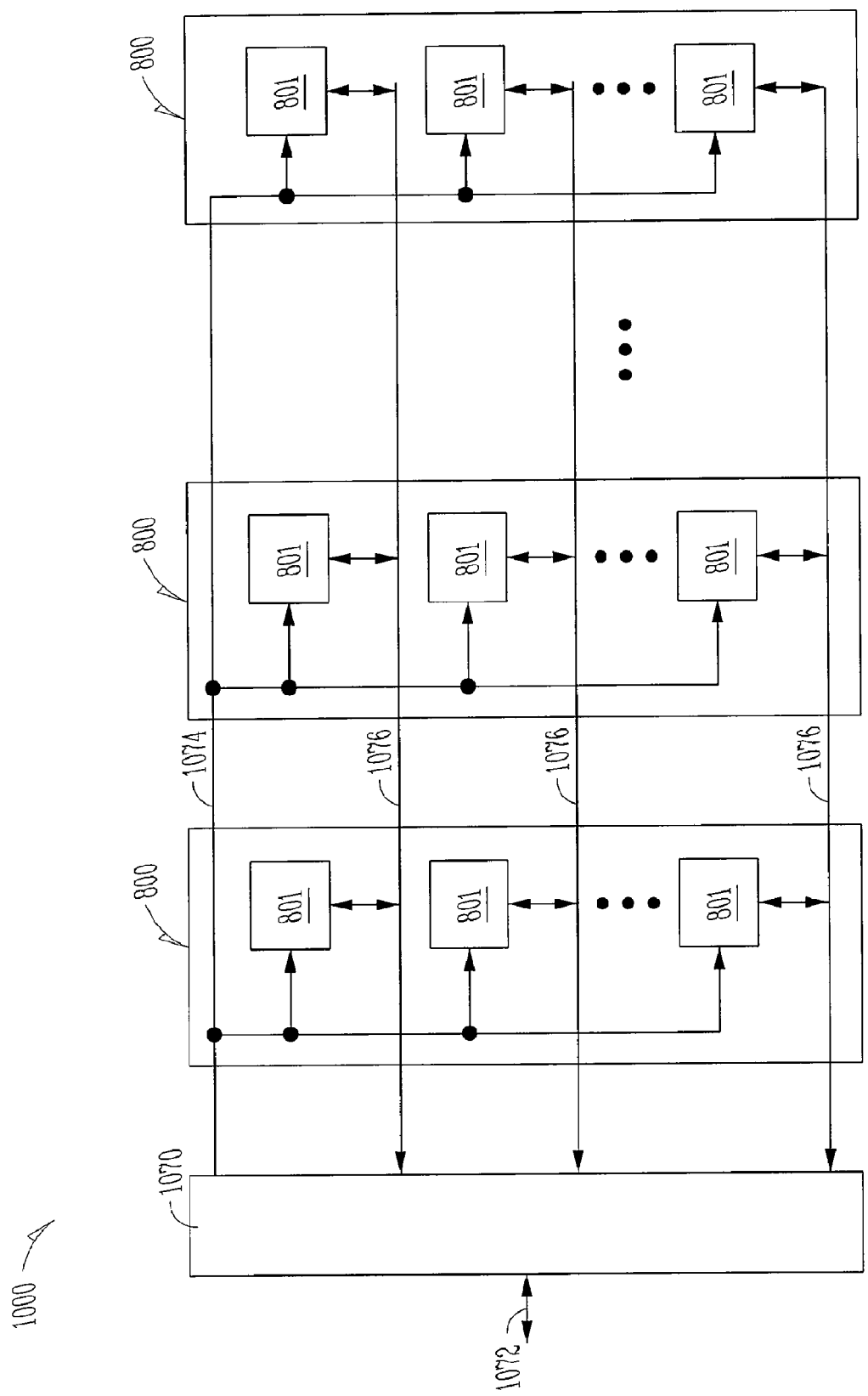
FIG. 10 illustrates a block diagram of a memory system, according to various embodiments.

FIG. 10 shows one embodiment of an electronic system as memory system 1000. Memory system 1000 contains one or more memory modules 800 and a memory controller 1070. At least one of the memory modules 800 includes a die having a regulated internal power supply in accordance with the present disclosure. Memory controller 1070 provides and controls a bidirectional interface between memory system 1000 and an external system bus 1072. Memory system 1000 accepts a command signal from the external bus 1072 and relays it to the one or more memory modules 800 on a command link 1074. Memory system 1000 provides for data input and data output between the one or more memory modules 800 and external system bus 1072 on data links 1076.

Figure 11:
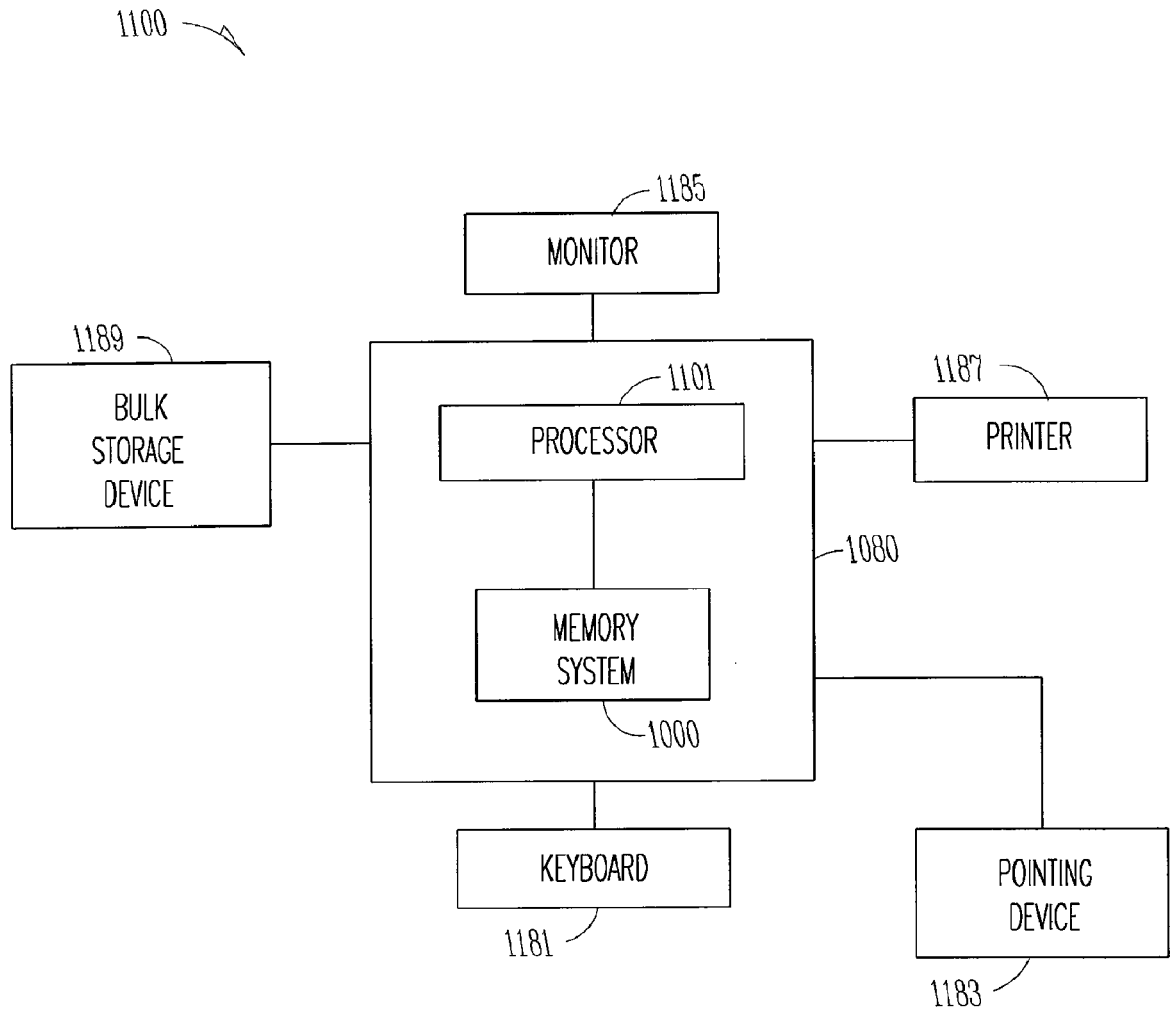
FIG. 11 illustrates a block diagram of a computer system, according to various embodiments.

FIG. 11 shows a further embodiment of an electronic system as a computer system 1100. Computer system 1100 contains a processor 1101 and a memory system 1000 housed in a computer unit 1080. In one embodiment, the memory system 1000 includes a die having a regulated internal power source in accordance with the present disclosure. In another embodiment, processor 1101 includes a die having a regulated internal power source in accordance with the present disclosure. Computer system 1100 is but one example of an electronic system containing another electronic system, i.e., memory system 1000, as a subcomponent. Computer system 1100 optionally contains interface components. Depicted in FIG. 11 are a keyboard 1181, a monitor 1185, a pointing device 1183 such as a mouse, trackball or joystick, a monitor 1185, a printer 1187 and a bulk storage device 1189. It will be appreciated that other components are often associated with computer system 1100 such as modems, device drivers, additional storage devices, etc. These other components, in still another embodiment, include at least one die containing a regulated internal power source in accordance with the present disclosure. It will be appreciated that the processor 1101 and memory system 1000 of computer system 1100 can be incorporated on a single integrated circuit. Such single package processing units reduce the communication time between the processor and the memory circuit.

Advantages of the presently disclosed regulated power supply include, but are not limited to: the disclosed supply regulates voltage for parts that require their internal supply voltage to be equal to or greater than the level of the external supply; the internal supply voltage varies with the external supply voltage with a tunable positive gradient, which allows for easier margin testing; the internal supply voltage is more temperature insensitive than previous supplies due to curvature compensation; the disclosed supply is more accurate and easier to start up and tune; the internal supply voltage is less noisy; there is only a small overall increase in quiescent current at the supply block; and there is a potential improvement in product yield due to these internal supply voltage improvements.

One of ordinary skill in the art will understand that, the modules and other circuitry shown and described herein can be implemented using software, hardware, and combinations of software and hardware. As such, the illustrated modules and circuitry are intended to encompass software implementations, hardware implementations, and software and hardware implementations.

The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods provided above are implemented as a computer data signal embodied in a carrier wave or propagated signal, that represents a sequence of instructions which, when executed by a processor cause the processor to perform the respective method. In various embodiments, methods provided above are implemented as a set of instructions contained on a computer-accessible medium capable of directing a processor to perform the respective method. In various embodiments, the medium is a magnetic medium, an electronic medium, or an optical medium.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments as well as combinations of portions of the above embodiments in other embodiments will be apparent to those of skill in the art upon reviewing the above description. The scope of the present subject matter should be determined with reference to the appended claims, along with the full scope of equivalents to which such claims are entitled.

What is claimed is:

1. A system, comprising:
   a DC to DC converter adapted to connect to an external supply voltage, the converter further adapted to increase voltage level above a level of the external supply voltage;
   a low pass filter connected to the DC to DC converter;
   a current-mode bandgap voltage reference (BVR) connected to the low pass filter, the BVR adapted to provide second order curvature correction and to provide a tunable voltage reference gradient with respect to the external supply voltage, wherein the BVR includes a self-biasing current mirror; and
   a power amplifier connected to the BVR and to a circuit die, the power amplifier adapted to provide a stable internal supply voltage to the die.

2. The system of claim 1, wherein the DC to DC converter includes a switched-capacitor power supply converter.

3. The system of claim 2, wherein the DC to DC converter is adapted to operate at at least 90% power efficiency.

4. The system of claim 2, wherein the DC to DC converter includes at least one charge pump.

5. The system of claim 1, wherein the low pass filter includes an RC (resistor-capacitor) filter.

6. A method, comprising:
   receiving a voltage signal having a first potential from an external supply;
   increasing the voltage signal to a second potential using a DC to DC converter, wherein the second potential is greater than the first potential;
   removing high frequency components from the voltage signal;
   providing a voltage reference to at least one power amplifier, the voltage reference having a tunable gradient with respect to the first voltage level using a current-mode bandgap voltage reference (BVR), the BVR having the voltage signal as an input, wherein the BVR includes a self-biasing current mirror; and
   providing a stable internal supply voltage to a circuit die connected to the at least one power amplifier.

7. The method of claim 6, wherein removing high frequency components from the voltage signal includes using an RC low pass filter.

8. The method of claim 6, wherein providing a stable internal supply voltage to a circuit die includes cascading multiple power amplifiers.

9. The method of claim 6, wherein providing a voltage reference includes providing a voltage reference having second order curvature correction.

10. The method of claim 9, wherein providing a voltage reference includes using short channel modulation effect of the current mirror.

11. A method of forming a power supply, comprising:
   forming a DC to DC converter adapted to connect to an external supply voltage, the converter further adapted to increase voltage level above a level of the external supply voltage;
   forming a low pass filter connected to the DC to DC converter;
   forming a current-mode bandgap voltage reference (BVR) connected to the low pass filter, the BVR adapted to provide second order curvature correction and to provide a tunable voltage reference gradient with respect to the external supply voltage, wherein the BVR includes a self-biasing current mirror; and
   forming a power amplifier connected to the BVR and to a circuit die, the power amplifier adapted to provide a stable internal supply voltage to the die.

12. The method of claim 11, wherein forming a DC to DC converter adapted to connect to an external supply voltage includes forming a DC to DC converter adapted to connect to a supply voltage having a range of potentials within an energy efficient input voltage working range of the DC to DC converter.

13. The method of claim 11, wherein forming a power amplifier connected to the BVR and to a circuit die includes forming a power amplifier connected to the BVR and to a circuit die including at least one memory circuit.

14. The method of claim 11, wherein a current-mode bandgap voltage reference (BVR) connected to the low pass filter includes forming a current-mode bandgap voltage reference having an adjustable positive gradient with respect to the external supply voltage.

15. The method of claim 14, wherein forming a current-mode bandgap voltage reference having an adjustable positive gradient with respect to the external supply voltage includes summing positive TC current and negative TC current.

16. A semiconductor die, comprising:
   a substrate;
   an integrated circuit formed on the substrate; and
   a power supply formed on the substrate and adapted to supply current to the integrated circuit, the power supply including:
   a DC to DC converter adapted to connect to an external supply voltage, the converter further adapted to increase voltage level above a level of the external supply voltage;
   a low pass filter connected to the DC to DC converter;
   a current-mode bandgap voltage reference (BVR) connected to the low pass filter, the BVR adapted to provide second order curvature correction and to provide a tunable voltage reference gradient with respect to the external supply voltage, wherein the BVR includes a self-biasing current mirror; and
   a power amplifier connected to the BVR and to the integrated circuit, the power amplifier adapted to provide a stable internal supply voltage to the integrated circuit.

17. The semiconductor die of claim 16, wherein the integrated circuit includes at least one memory device.

18. The semiconductor die of claim 17, wherein the level of the external supply voltage is about 1.8 Volts.

19. The semiconductor die of claim 18, wherein the memory device is adapted to operate using a supply voltage of 1.8 Volts.

20. The semiconductor die of claim 17, wherein the memory device includes a DDR2 SDRAM device.

21. An electronic system, comprising:
a processor;
a memory system coupled to the processor, the memory system including:
   at least one memory circuit; and
   a power supply adapted to supply current to the memory circuit, the power supply including:
      a DC to DC converter adapted to connect to an external supply voltage, the converter further adapted to increase voltage level above a level of the external supply voltage;
      a low pass filter connected to the DC to DC converter;
      a current-mode bandgap voltage reference (BVR) connected to the low pass filter, the BVR adapted to provide second order curvature correction and to provide a tunable voltage reference gradient with respect to the external supply voltage, wherein the BVR includes a self-biasing current mirror; and
      a power amplifier connected to the BVR and to the memory circuit, the power amplifier adapted to provide a stable internal supply voltage to the memory circuit.

22. The electronic system of claim 21, wherein the level of the external supply voltage is about 1.8 Volts.

23. The semiconductor die of claim 21, wherein the memory device is adapted to operate using a supply voltage of 1.8 Volts.

24. The semiconductor die of claim 21, wherein the memory device includes a DDR2 SDRAM device.

* * * * *